United States Patent [19]
Lynam et al.

[11] Patent Number: 5,122,647
[45] Date of Patent: Jun. 16, 1992

[54] VEHICULAR MIRROR SYSTEM WITH REMOTELY ACTUATED CONTINUOUSLY VARIABLE REFLECTANCE MIRRORS

[75] Inventors: Niall R. Lynam; Dale M. Roberts, both of Holland, Mich.

[73] Assignee: Donnelly Corporation, Holland, Mich.

[21] Appl. No.: 565,652

[22] Filed: Aug. 10, 1990

[51] Int. Cl.⁵ .............................................. G01J 1/20
[52] U.S. Cl. ............................ 250/201.1; 250/214 AL
[58] Field of Search .................... 250/214 AL, 201.1; 350/279; 359/604

[56] References Cited

U.S. PATENT DOCUMENTS

| | | |
|---|---|---|
| 3,451,741 | 6/1969 | Manos . |
| 3,521,941 | 7/1970 | Deb et al. . |
| 3,578,843 | 5/1971 | Castellion . |
| 3,708,220 | 1/1973 | Meyers et al. . |
| 3,774,988 | 11/1973 | Rogers . |
| 3,807,832 | 4/1974 | Castellion . |
| 3,862,798 | 1/1975 | Hopkins . |
| 4,088,392 | 5/1978 | Meyers . |
| 4,161,653 | 7/1979 | Bedini et al. . |
| 4,181,406 | 1/1980 | Kohara et al. . |
| 4,201,451 | 5/1980 | Jacob . |
| 4,293,194 | 10/1981 | Takahashi . |
| 4,298,870 | 11/1981 | Saegusa . |
| 4,299,444 | 11/1981 | Romer . |
| 4,512,637 | 4/1985 | Ballmer . |
| 4,529,275 | 7/1985 | Ballmer . |
| 4,529,873 | 7/1985 | Ballmer et al. . |
| 4,623,222 | 11/1986 | Itoh et al. . |
| 4,645,975 | 2/1987 | Meitzler et al. ............. 250/214 AL |
| 4,655,549 | 4/1987 | Suzuki et al. . |
| 4,671,615 | 6/1987 | Fukada et al. . |
| 4,676,601 | 6/1987 | Itoh et al. . |
| 4,690,508 | 9/1987 | Jacob . |
| 4,693,558 | 9/1987 | Nakaho et al. . |
| 4,701,022 | 10/1987 | Jacob . |
| 4,741,603 | 5/1988 | Miyagi et al. . |
| 4,762,401 | 8/1988 | Baucke et al. . |
| 4,781,436 | 11/1988 | Armbruster . |
| 4,792,220 | 12/1988 | Janowicz . |
| 4,793,690 | 12/1988 | Gahan et al. . |
| 4,809,082 | 1/1989 | Kohara et al. . |
| 4,824,221 | 4/1989 | Endo et al. . |
| 4,828,361 | 5/1989 | Alten et al. . |
| 4,838,650 | 6/1989 | Stewart et al. . |
| 4,878,743 | 11/1989 | Aikawa et al. . |
| 4,886,960 | 12/1989 | Molyneux et al. . |
| 4,896,030 | 1/1990 | Miyaji . |
| 4,917,477 | 4/1990 | Bechtel et al. . |

FOREIGN PATENT DOCUMENTS

| | | |
|---|---|---|
| 0074015 | 3/1983 | European Pat. Off. . |
| 57-173801 | 10/1982 | Japan . |
| 57-208530 | 12/1982 | Japan . |
| 57-208531 | 12/1982 | Japan . |
| 60-139545 | 7/1985 | Japan . |
| 61-54942 | 4/1986 | Japan . |

OTHER PUBLICATIONS

Schott bulletin pp. 11–17, No. 1/1983–English.

*Primary Examiner*—David C. Nelms
*Assistant Examiner*—K. Shami
*Attorney, Agent, or Firm*—Price, Heneveld, Cooper, DeWitt & Litton

[57] ABSTRACT

A mirror system for use on a vehicle includes one or more remotely actuated mirrors that may be mounted on the interior or exterior of the vehicle. Each mirror has a continuously variable reflective element such as a solid-state electrochromic device or an electrochemichromic cell. A first user actuated input device provides a comfort level-setting control that allows the driver to select a reflectance level for one or more mirrors at a comfortable level. A "panic button" overrides the first input device and lowers the reflectance level of one or more mirrors when an excessive glare condition is experienced. The lower reflectance level may be cancelled manually by a second actuation of the "panic button" or is automatically cancelled after a predetermined period of time to resume the normal comfort level of reflectance.

38 Claims, 4 Drawing Sheets

VEHICULAR MIRROR SYSTEM WITH REMOTELY ACTUATED CONTINUOUSLY VARIABLE REFLECTANCE MIRRORS

BACKGROUND OF THE INVENTION

This invention relates generally to mirror systems for vehicles and more particularly to such mirror systems having controls for adjustment of the reflectance level of one or more mirrors. The invention is especially adapted to mirror systems utilizing continuously variable reflectance elements such as electrochromic elements.

Automatic rearview mirrors which sense glare-producing light and ambient light conditions and which automatically control the reflectivity level of the mirror have become sophisticated in establishing an optimum reflectivity level. Examples of such systems are included in U.S. Pat. No. 4,793 690 to Edward A. Gahan et al for a REARVIEW MIRROR CONTROL CIRCUIT, and U.S. Pat. No. 4,886,960 to Keith W. Molyneux et al. for a CONTROL CIRCUIT FOR AN AUTOMATIC REARVIEW MIRROR. Such systems typically provide a manual sensitivity adjustment. The control then automatically establishes the reflectivity of the reflectance element based upon the sensed level of ambient light and glare-producing light, as well as the sensitivity level selected by the driver.

While such automatic controls are very satisfactory for many automotive applications, especially for automobiles and small trucks, they are not necessarily desirable for all applications. Truck drivers and other professional drivers use their mirrors as a primary driving aid and, as such, use their mirrors to a much greater extent than do ordinary drivers. Because of the primary importance served by the rearview mirrors to professional drivers, such drivers desire greater personal control over operation of the mirror. Mirror glare is an especially severe problem for professional drivers who drive for long periods and are more likely to be driving during nighttime hours. Such glare creates eye fatigue which adds to the overall fatigue experienced during long trips. Therefore, what may be a mere annoyance to a casual driver, may be a safety problem for the professional driver.

Non-professional drivers also often desire greater user control over the reflectance level of the mirrors. Remotely actuated mirrors have been provided which allow the driver to actuate a two-state, prism-type mirror between states. While such remotely actuated mirrors put control of the mirror in the hands of the driver, they do little more than duplicate the manual flipping of a conventional mechanical rearview mirror.

SUMMARY OF THE INVENTION

The present invention provides a vehicular mirror system that puts a premium on driver comfort. Control over the reflectance level of the mirror is provided to the driver in a manner that is rational and therefore natural to use. The invention provides a high level of visibility in the mirrors consistent with the driver's comfort level while providing exceptional glare protection.

The present invention is embodied in a rearview mirror system for a vehicle having a variable reflective element, with a reflectivity level that is continuously variable, and user level setting means for manually setting the reflectivity level of the reflective element at a comfort value. Override means that is responsive to selective actuation upon a glare condition sets the reflectivity level of the reflective element at an override value that is lower than the set comfort value. According to one aspect of the invention, the reflectivity of the reflective element is lowered manually by the vehicle driver actuating the override means and is returned to the comfort value upon a second actuation by the user of the override means, or upon the lapse of a predetermined time duration, whichever is the first to occur.

The invention may be embodied in a mirror system having more than one mirror. If more than one mirror is provided, the desired reflectance values of all mirrors may be individually set with separate level setting means or may be jointly set by a common level setting means. The override of the mirrors may be accomplished jointly with a single actuatable means or individually with separate actuatable means. Such a mirror system may additionally include one or more mirrors which are automatically controlled in a more conventional manner.

In a preferred embodiment, an electrochromic mirror having tandem construction, in which a pair of electrochromic devices are optically aligned in tandem, is used as the variable reflectance element. The comfort reflectivity level is achieved by alternatingly coloring and bleaching both electrochromic elements with one element bleaching while the other is coloring. When the override means is actuated, both elements are concurrently colored in order to achieve the further reduction in reflectance.

These and other objects, advantages and features of this invention will become apparent upon review of the following specification in conjunction with the drawings.

DESCRIPTION OF THE PREFERRED EMBODIMENT

Figure 1A:
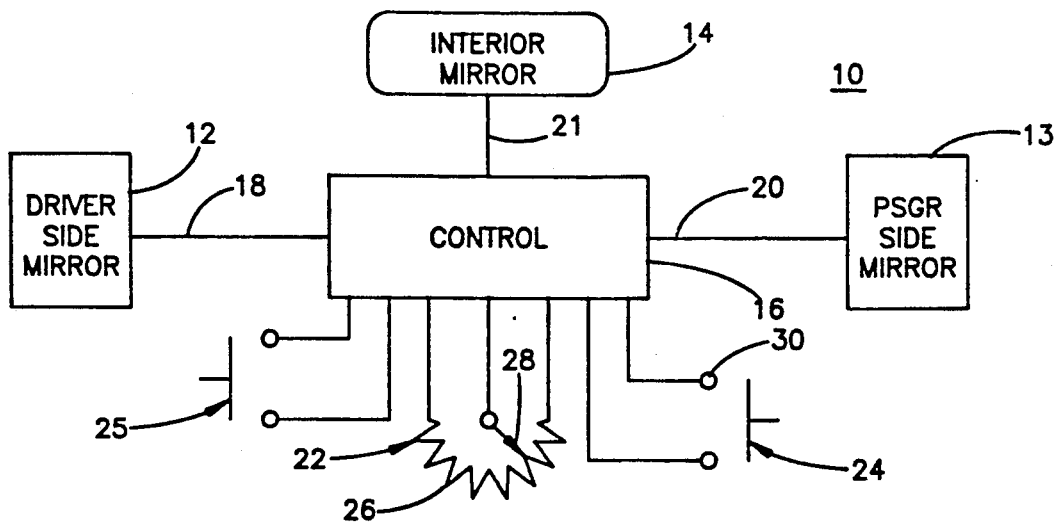
FIGS. 1A–1D are block diagrams of vehicular mirror systems according to the present invention.
Figure 1B:
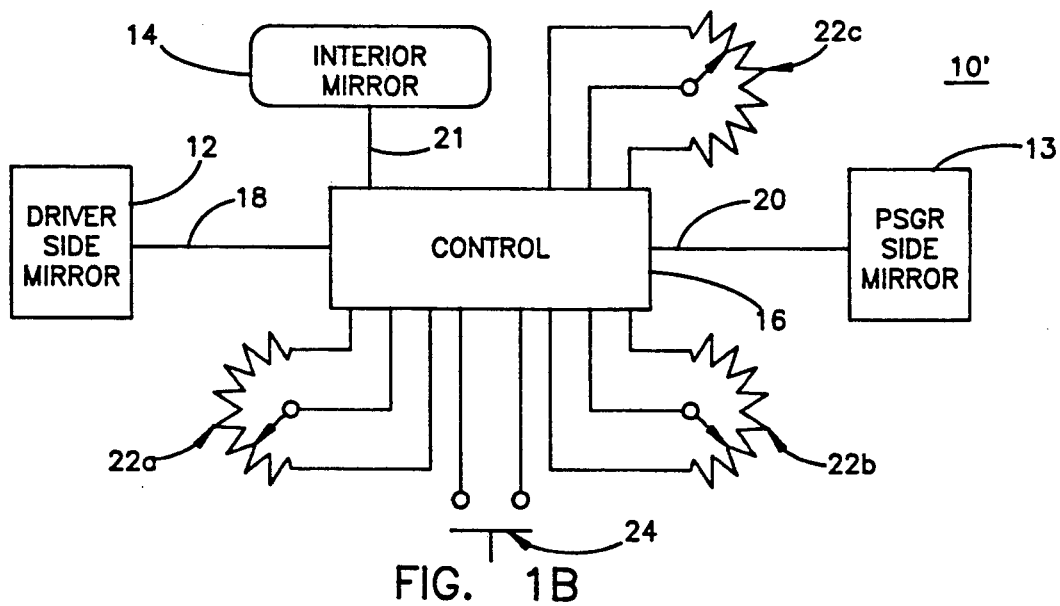
Figure 1C:
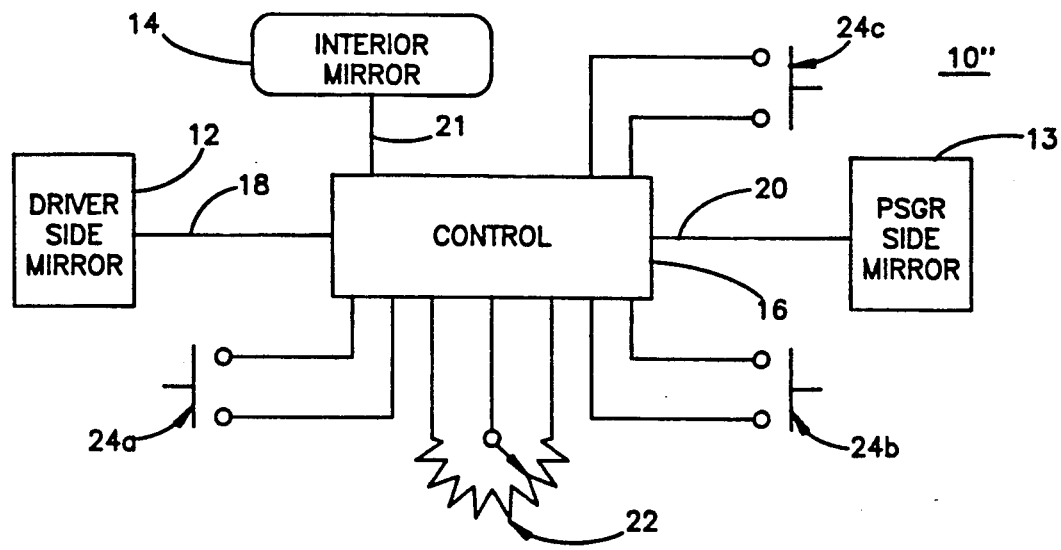
Figure 1D:
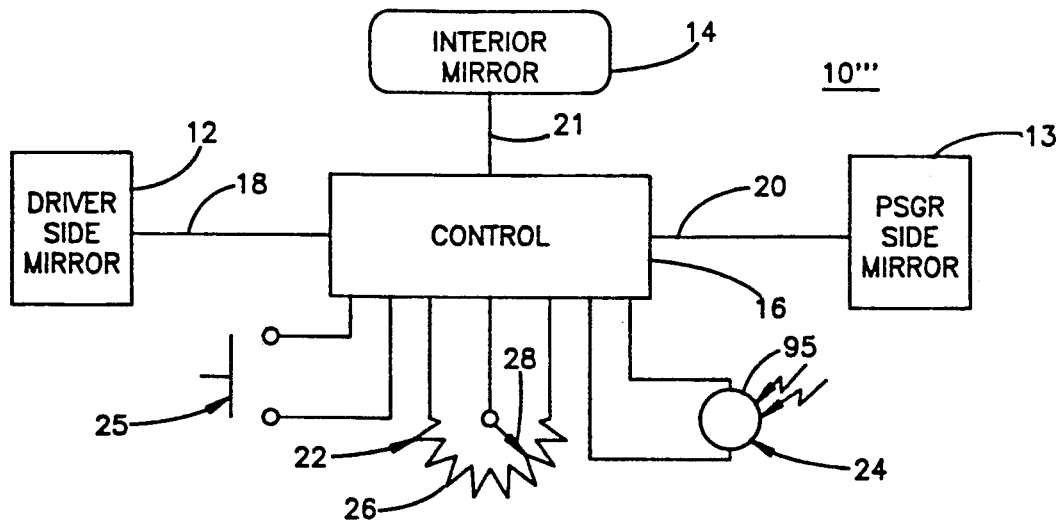

Referring now specifically to the drawings and the illustrative embodiments depicted therein, a mirror system 10 is illustrated as including a driver side mirror 12, typically mounted to the driver's door on the exterior of the vehicle, a passenger side mirror 13 mounted to the exterior of the passenger side door, an interior mirror 14 mounted in the interior of the vehicle and a control 16 for providing signals over output lines 18, 20 and 21 in order to control the respective reflectance level of mirrors 12, 13 and 14 (FIGS. 1A–1D). In the illustrated embodiment, mirrors 12, 13 and 14 have reflectance elements with reflectivity levels that are continuously variable over a range of approximately from 6-80%. The reflectivity of mirrors 12, 13 and 14 is established by signals provided on lines 18, 20 and 21, respectively, which may be analog voltage, analog current, pulse width modulated digital signals or the like. In one preferred embodiment, mirrors 12, 13 and 14 are solid-state electrochromic elements such as disclosed in U.S. Pat. No. 4,712,879, the disclosure of which is hereby incorporated by reference herein. This technology is more readily adaptable to large area mirrors, particularly large mirrors of the type used on large trucks, and is very suitable for use as curved mirrors because it requires only a single sheet of glass to bend and it is capable of operation at low reflectivity values for extended periods of time without a segregation of coloration, as occurs with other types of electrochromic elements.

Mirror system 10 additionally includes a first user selection means 22, which is provided for the purpose of allowing the driver to select a comfortable reflectivity level based upon particular driving conditions and the desires of the driver. As previously mentioned, the professional driver utilizes mirrors as a primary driving aid and will typically select a reflectance level that provides exceptionally good visibility from the mirrors, even if occasional glare levels become somewhat uncomfortable. Mirror system 10 additionally includes a second input device 24 that, when actuated, abruptly decreases the reflectivity of the mirrors. The second input device provides an override mode, or "panic button," for quickly responding to excessive glare conditions. When input device 24 is actuated, mirrors 12, 13 and 14 are rapidly colored to their minimum reflectivity level. When the glare condition ceases, a second actuation of input device 24 restores control over the reflectivity level of mirrors 12, 13 and 14 to the first input device 22. If the driver does not return the mirrors to their higher reflectivity level after a predetermined period of time, control 16 will automatically do so.

First user input device 22 is illustrated as a variable potentiometer 26 that allows the user to select from a continuum of reflectivity levels based upon the position of wiper 28. While it may be desirable to allow the driver to select any reflectivity level within the physical capability of mirrors 12, 13 and 14, in a preferred embodiment, variable potentiometer 26 is capable of adjusting the reflectivity of mirrors 12, 13 and 14 in a range of approximately 30-80%. It has been discovered that, below approximately 30%, drivers are sometimes unable to clearly discern the shapes of objects viewed in the mirror. Accordingly, it is deemed desirable to limit the driver's choice of a comfort reflectivity setting to a level that maintains good rearward visibility and that provides moderate glare protection. When extreme glaring conditions are experienced, the override mode through input device 24 allows the driver to temporarily relinquish some rear visibility in return for added glare protection.

Figure 4:
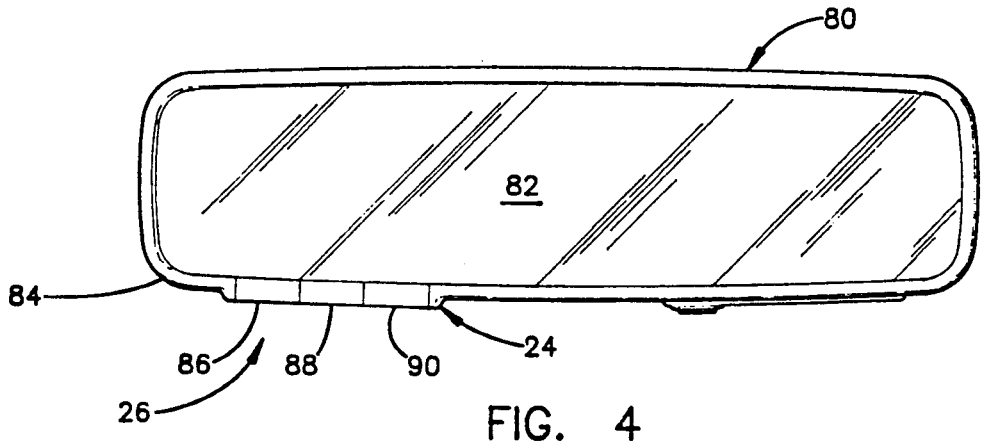
FIG. 4 illustrates the invention applied to an interior mirror.

In an embodiment illustrated in FIG. 4, an interior mirror 80 includes a variable reflective element 82 mounted within a housing 84. In this embodiment, first input device 22 is illustrated in the form of a slew-control having momentary switches 86 and 88 which, when activated, cause the reflectance level of the mirror to slew upwardly or downwardly. Second, input device 24 is illustrated in the form of a single momentary switch 90. Switches 86, 88 and 90 could be mechanical, membrane or capacitive and are typically manually activated. This embodiment of the invention is convenient as an "option" because the entire mirror system, including controls, is packaged in one unit.

Figure 5:
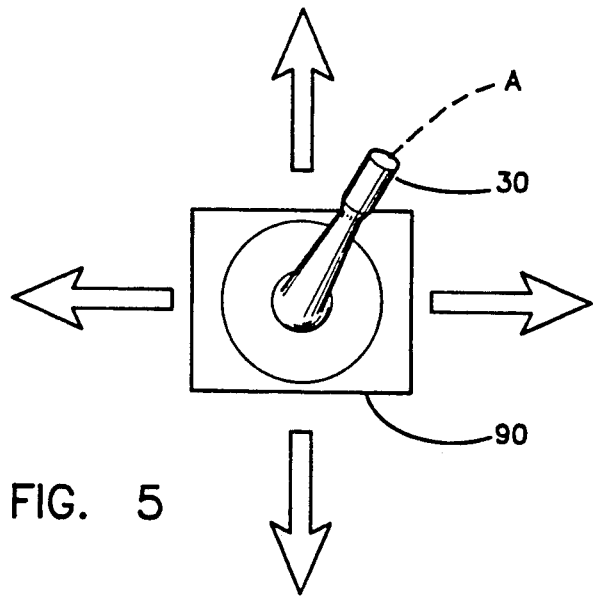
FIG. 5 illustrates a remote mirror position control device incorporating the invention.

In the embodiment illustrated in FIG. 5, push button switch 30 is integrated with a "joystick" 90 used to adjust the position of the exterior mirrors 12, 14. In such embodiment, switch 30 could be actuated by pressing axially on the joystick as shown at A. While first input device 22 is illustrated as a continuously variable potentiometer, it may alternatively be a discrete step switch that selects between a finite number of discrete reflectance levels for the mirror or as a slew-control as illustrated in FIG. 4. Input devices 22 and 24 could be manually activated, voice activated, touch activated, infrared remotely activated, or any similar device. Specifically, input device 24 could be a rearward facing photodetection means 95 (FIG. 1D) which measures the instantaneous glare causing light level and which, when severe glaring conditions exist, commands the control unit 16 to dim the reflectivity of the mirror system, either to a partial or a minimum reflectivity, from the comfort reflectivity level set by input device 22.

In the embodiment illustrated in FIG. 1A, the comfort reflectivity level of mirrors 12, 13 and 14 is jointly established by first input device 22. Upon the experiencing of a glare condition, mirrors 12, 13 and 14 are also simultaneously colored to a minimum reflectance level by the actuation of a single user input device 24. An alternative embodiment, illustrated in FIG. 1B, includes separate comfort reflectance level controls 22A, 22B and 22C for establishing separate comfort levels for mirrors 12, 13 and 14, respectively. This accommodates the frequent difference in the light environment at different locations on the vehicle as well as the difference in the extent to which the different mirrors are relied upon. In the FIG. 1B embodiment, however, a single override input device 24 causes mirrors 12, 13 and 14 to simultaneously color to a low reflectivity state. In another alternative embodiment, illustrated in FIG. 1C, a single input device 22 establishes the comfort reflectance level of mirrors 12, 13 and 14 while separate override devices 24A, 24B and 24C are provided to individually color mirrors 12 and 14, respectively, to low reflectivity states. Other combinations would also be apparent to those skilled in the art.

Figure 2:
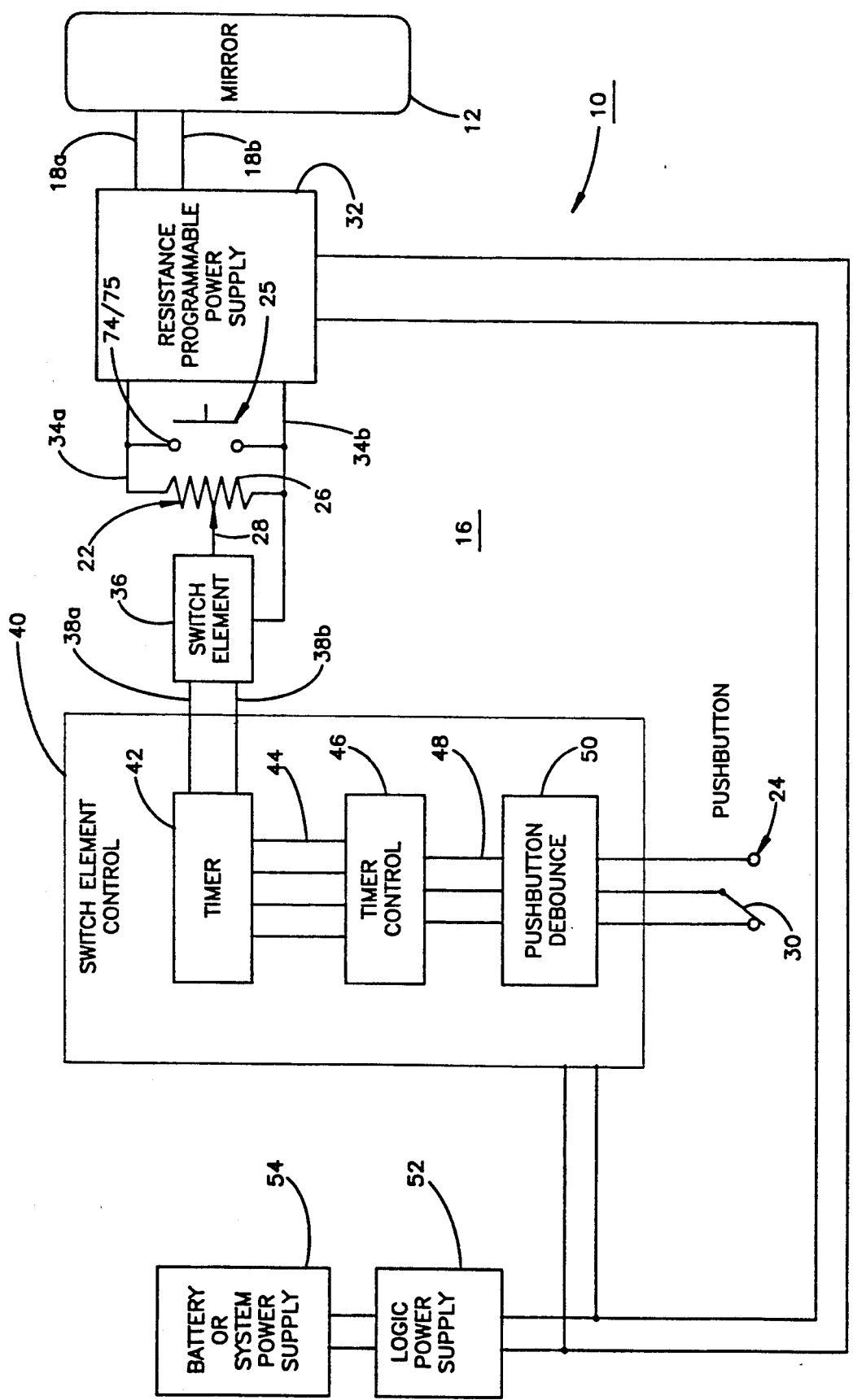
FIG. 2 is a more detailed block diagram of a single-mirror control according to the invention.

In an embodiment of mirror system 10 illustrated in FIG. 2, in which only one mirror (12) is illustrated for clarity, a resistance-programmable power supply 32 establishes a variable analog voltage on its output lines 18A, 18B extending to mirror 12. The value of the analog voltage on lines 18A, 18B is established by the resistance value across lines 34A and 34B that are input lines to power supply 32. The resistance between lines 34A and 34B is established by the position of wiper 28 along potentiometer 26 if a switch element 36 is closed, i.e., electrically interconnecting, or shorting, wiper 28 with line 34B. If switch element 36 is open, then the resistance of the main winding of potentiometer 26 establishes the resistance between lines 34A and 34B irrespective of the position of wiper 28.

The open/closed state of switch element 36 is established by output lines 38A, 38B extending from a switch element control 40. Switch element control 40 includes a timer circuit 42 which produces output on lines 38A, 38B and receives inputs on lines 44 extending from a timer control circuit 46. Timer control circuit 46 receives its input on lines 48 from a push button debounce circuit 50 which, in turn, is connected with single pole momentary double-throw switch 30. Switch element control 40 and resistance-programmable power supply 32 receive regulated DC supply voltage from a power supply 52 that is powered from the vehicle's battery system 54.

Under normal driving conditions, timer 42 produces signals on lines 38A, 38B causing switch element 36 to be closed. This allows the user to select the reflectivity level of mirror 12 by adjusting the position of wiper 28 of potentiometer 26. The variable resistance provided by movement of wiper 28 is translated by power supply 32 into a variable analog signal on lines 18A, 18B. When the driver experiences a glare condition that the driver desires to be compensated for, the driver actuates push button 30. Upon actuation of push button 30, timer 42 changes the state of the signal on lines 38A, 38B which causes switch element 36 to open. This causes the resistance across lines 38A, 38B to be at a maximum value established by the resistance of the main winding of potentiometer 26, which corresponds to a maximum analog output on lines 18A, 18B. This colors mirror 12 to a minimum reflectivity level at rapid rate. If push button 30 is again actuated while timer 42 is timing, timer control 46 will respond by resetting timer 42. This will cause the output of timer 42 on lines 38A, 38B to again close switch element 36 to return control of the reflectance level of mirror 12 to wiper 28 of potentiometer 26. If timer 42 times out without push button 30 being pressed, it resets and produces outputs on lines 38A, 38B which closes switch element 36 and returns control to wiper 28. Therefore, after wiper 28 is overridden by the actuation of push button 30, control is returned to wiper 28 upon the first occurrence of the driver reactuating push button 30 or timer 42 timing out. In the illustrative embodiment, timer 42 is set for 130 seconds but a shorter or longer period may be used.

Figure 3:
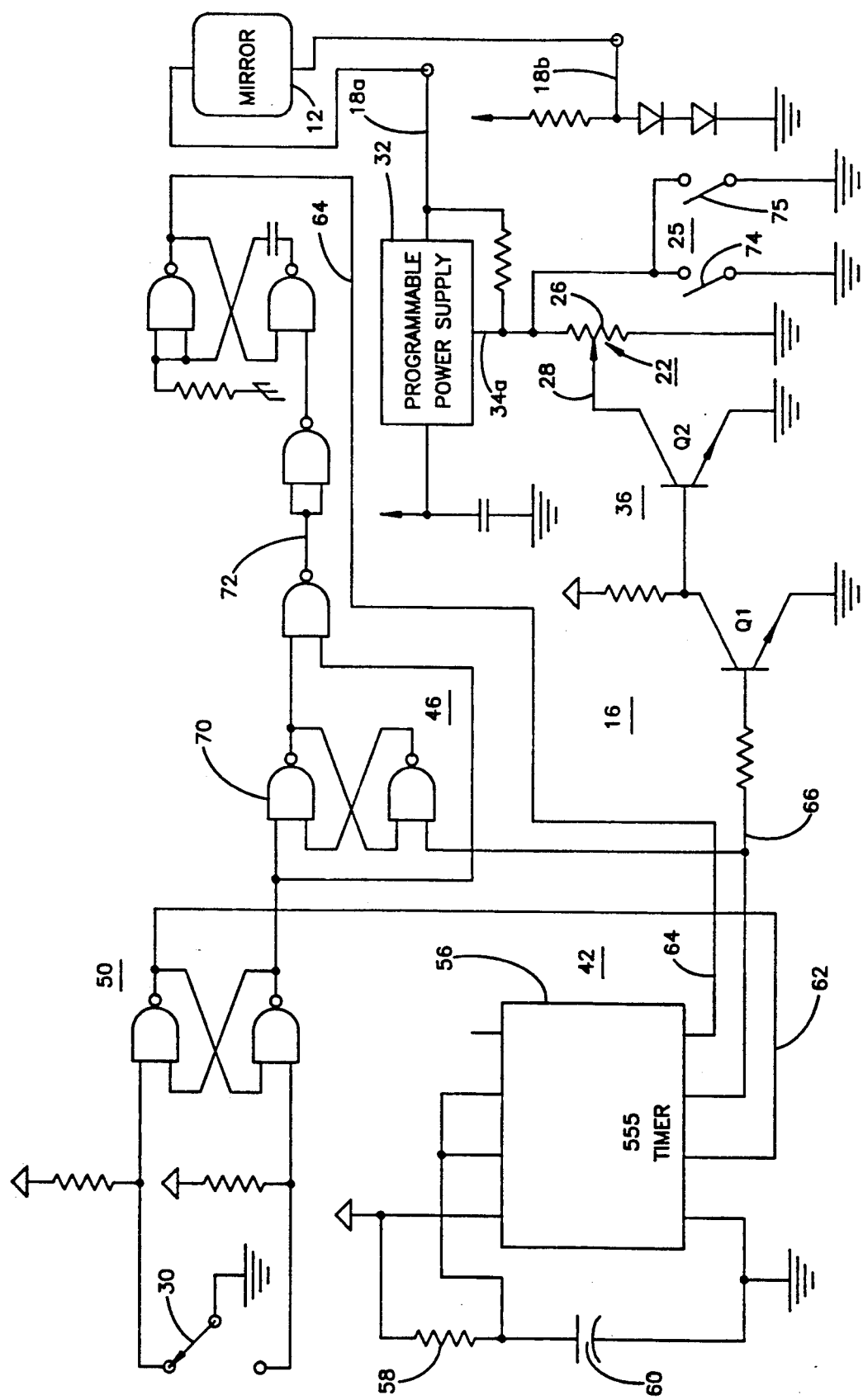
FIG. 3 is a schematic diagram of a control circuit of an embodiment of the invention.

A detailed embodiment of control 16 is illustrated in FIG. 3, in which a conventional timer circuit 56, whose time duration is established by a resistor 58 and capacitor 60, is set by the actuation of its set line 62 and reset by actuation of its reset line 64. When set, timer circuit 56 produces an output on line 66 that turns a transistor Q1 which turns off, or opens, a transistor Q2. Transistors Q1 and Q2 define switch element 36. Resistance-programmable power supply 32 produces an output on line 18A that is proportional to the resistance on its input line 34A, which is established by the resistance of potentiometer 26, irrespective of the position of wiper 28, when transistor Q2 is turned off. Transistor Q2 is turned on when timer circuit 56 is reset with its output on line 66 at a low level, which causes transistor Q1 to be open and Q2 to be conducting. Timer control circuit 46 includes a latch-circuit 70 which produces an output on line 72 when switch 30 is actuated with output 66 in a set state. This produces, in turn, a reset pulse on line 64 to reset timer circuit 56 if it is timing. If timer circuit 56 is not timing, the actuation of switch 30 does not produce a reset pulse on line 64. In the embodiment illustrated in FIG. 3, a switch 74, when closed, shorts potentiometer 26. This causes the output on lines 18A and 18B to go to the minimum analog output voltage which is maximum reflectivity condition. Thus, switch 74 serves as a day mode switch to place the mirror system 10 in a maximum reflectivity state. When switch 74 is then open, the reflectivity of the mirror returns to the comfort level previously set by the driver.

In another embodiment, mirrors 12, 13 and 14 are electrochromic mirror assemblies having a pair of electrochromic elements optically aligned in a tandem, back-to-back arrangement as disclosed in commonly-owned, co-pending application Ser. No. 565,660 (Donnelly P-467), filed concurrently herewith, invented by Niall R. Lynam et al. for a PROLONGED COLORATION ELECTROCHROMIC ASSEMBLY, the disclosure of which is hereby incorporated herein by reference, and will not be repeated in detail. Suffice to say that, in a preferred embodiment, three glass elements are used with the two outer glass elements being spaced from the single central glass element to form two cavities which enclose an electrochromically active solution, thus creating two tandemly aligned single-compartment, self-erasing, solution-phase devices. The inwardly facing surfaces of the two outer glass panels and both surfaces of the middle glass substrate are coated with an indium tin oxide transparent conductor coating of high transparency (greater than 80% transmission or thereabouts) and low sheet resistance (in the range 8 to 15 ohms/square or thereabouts). The exterior surface of one of the outer glass elements is silver coated to make it reflective when viewed through the remainder of the assembly. The two spaces formed between the outer glass elements and the single, middle element is filled with an electrochromically active solution comprising 0.025M methylviologen perchlorate, 0.025M 5,10-dihydro-5,10-dimethylphenazine, 5% wt per volume Uvinul 400$^{TM}$ stabilizer from BASF Wyandotte, Wyandotte, Mich., dissolved in a solvent comprising 50% by volume 3-hydroxypropionitrile and 50% by volume 3,3'-oxydipropionitrile. To best suit the present invention, the spacings of the respective outside glass elements from the single, middle glass element are equal and thin with a spacing in the 30 microns to 125 microns range desirable.

Cyclical application of a user adjustable zero to one volt potential, as described in the co-pending application, such that the electrochromic solution in one of the spaces colors while that in the other space bleaches, will achieve a comfort reflectivity level in the 15-75% region or thereabouts with the specific reflectance level achieved being principally determined by the voltage selected and the spacing. Thin spacing leads to increased self-erasure which in turn leads to fast bleaching and lower coloration/moderate reflectance. However, when the override means is actuated in response to severe glaring conditions, a one volt coloration can be concurrently applied across the electrochromic solutions in both spaces such that they both color simultaneously and rapidly such that minimum in reflectivity is achieved. A suitable choice for the central glass element is 0.028 inch soda lime glass coated on both faces with full wave ITO transparent conductors of sheet resistance approximately 8 ohms per square. A suitable choice for the outside glass elements is 0.063 inch soda lime glass, coated on the inwardly facing surface with full wave (8 ohms/square) ITO transparent conductor. A suitable spacing is 75 microns or thereabouts. This construction allows use of a fixed or variable applied voltage and choice of cyclical powering of one or the other of the two cells in the tandem device to achieve a comfort level and also allows concurrent powering of both cells to achieve an override or "panic" level for severe glare protection. A user-defined variable voltage can be applied during the cyclical powering so that a range of partial reflectances for the comfort level can be user selected. When the override mode is selected, a one volt potential can be concurrently applied across the two cells to rapidly power both to their fully colored states and, thereby, achieve a minimum reflectance from the mirror assembly.

Because the override input device 24 is intended to rapidly force the associated mirrors 12, 13 and 14 to a minimum reflectivity level, it may be desirable to provide a dynamic circuit between power supply 32 and the mirror to increase the rate of coloration of the mirror. Such rapid-coloration feature as disclosed in commonly-owned European Patent Application 0 426 503 A1, published Aug. 5, 1991 by Thomas D. Gaffney et al., for a DRIVE CIRCUIT FOR AN ELECTROCHROMIC CELL, the disclosure of which is hereby incorporated herein by reference, may be especially useful. The details of such rapid-coloration circuit are disclosed in the Gaffney et al application and will not be repeated. Suffice to say, that a temporary overshoot is provided in the voltage supplied on lines 18A, 18B in order to rapidly color the mirror. The overshoot is of a short enough duration to not damage the mirror.

While the invention has been described with reference to its advantages when used by professional drivers and with large vehicles such as large trucks, its advantages are not limited in this manner and it may be useful in other applications. The invention comprehends the inclusion of memory means within control 16 such that the comfort setting of the mirror system for various drivers may be stored and called up when that driver is operating the vehicle. Other locations for the input devices will suggest themselves. For example, the input devices could be conveniently positioned on or adjacent to the steering wheel or the steering column.

The present invention is not only functional and capable of providing optimum individual control to the driver, but it is also natural in its use. Accordingly, its incorporation with other control devices, such as mirror-positioning devices that are already familiar to the driver, tends to cause the features of the invention to become second-nature to the driver with minimum or no instructions. This is especially important when the invention is applied to rental cars or in other applications where driver familiarity with the vehicle cannot be taken for granted. Also, the natural feel to the control will enhance the instinctive reactions of the driver and serve as an extension of the driver's control over the vehicle.

Changes and modifications in the specifically described embodiments can be carried out without departing from the principles of the invention which are intended to be limited only by the scope of the appended claims, as interpreted according to the principles of patent law including the doctrine of equivalents.

The embodiments of the invention in which an exclusive property or privilege is claimed are defined as follows.

1. A rearview mirror system for a vehicle comprising:
   a reflective element having a controllable variable reflectivity;
   a control that is adapted to establishing the level of reflectivity of said reflective element;
   a first user input device for said control that is adapted to causing said control to establish a first level of reflectivity of said reflective element;
   a second input device for said control that is adapted to causing said control to establish a second level of reflectivity of said reflective element that is less than said first level; and
   wherein said control responds to actuation of said second input device to selectively override said first input device, and wherein said control responds to deactuation of said second input device to return said level of reflectivity of said reflective element to the level of reflectivity established by said first user input device.

2. The rearview mirror system in claim 1 wherein said said first user input device is adapted to causing said control to establish said first level from a continuously variable first range of reflectivity levels.

3. The rearview mirror system in claim 2 wherein said reflectivity of said reflective element is variable over a second range of reflectivity levels and wherein said first range of reflectivity levels is a narrower range within said second range of reflectivity levels.

4. The rearview mirror system in claim 1 further including user actuatable resume mean for causing said second input device to cease being actuated.

5. A rearview mirror system for a vehicle comprising:
   a reflective element having a controllable variable reflectivity;
   a control that is adapted to establishing the level of reflectivity of said reflective element;
   a first user input device for said control that is adapted to causing said control to establish a first level of reflectivity of said reflective element;
   a second input device for said control that is adapted to causing said control to establish a second level of reflectivity of said reflective element that is less than said first level, wherein said second input device selectively overrides said first input device when actuated; and
   resume means for causing said second input device to cease being actuated, wherein said resume means includes timer means for causing said second input device to cease being actuated a predetermined time duration after being actuated.

6. The rearview mirror system in claim 5 wherein said resume means further includes override means that is user actuatable for causing said second input device to cease being actuated during said predetermined time duration.

7. The rearview mirror system in claim 1 including another reflective element having a controllable variable reflectivity and wherein said control is adapted to controlling the reflectivity of both of said reflective elements.

8. The rearview mirror system in claim 7 wherein said first user input device is adapted to causing said control to establish said first level of reflectivity for both of said reflective elements, and further including a third input device for said control that is adapted to causing said control to establish a third level of reflectivity for said another reflective element that is less than said first level and further wherein said control responds to actuation of said third input device to selectively override said first input device and responds to deactuation of said third input device to return said level of reflectivity of said another reflective element to the level of reflectivity established by said first user input device.

9. The rearview mirror system in claim 7 further including a third userinput device for said control that is adapted to causing said control to establish a third level of reflectivity of said another reflective element that is greater than said second level, wherein said second input device is adapted to causing said control to establish the level of reflectivity of said another reflective element at said second level, and wherein said control responds to actuation of said second input device to selectively override said first and third user input devices and wherein said control responds to deactuation of said second input device to return said level of reflectivity of said other reflective element to the level of reflectivity established by said third user input device.

10. The rearview mirror system in claim 8 wherein said second input device is adapted to causing said control to establish said second level of reflectivity for both of said reflective devices.

11. The rearview mirror system in claim 7 wherein said second input device is adapted to causing said control to establish said second level of reflectivity for both of said reflective devices.

12. The rearview mirror system in claim 11 wherein said including a third user input device for said control that is adapted to causing said control to establish a third level of reflectivity of said another reflective element that is grater than said second level and wherein said control responds to actuation of said second input device to selectively override said first and third user input devices.

13. The rearview mirror system in claim 1 wherein said second input device includes a photosensor that is responsive to glare-producing light exceeding a predetermined level in order to actuate said second input device.

14. The rearview mirror system in claim 1 wherein said second input device is user actuatable and deactuatable.

15. The rearview mirror system in claim 2 further including memory means for storing at least one value of said first level with electrical power is removed from said mirror system.

16. A rearview mirror system for a vehicle comprising:
   a variable reflective element having a reflectivity level that is continuously variable within predefined limits;
   a control circuit having an output port connected with said reflective element for providing a drive signal to establish the reflectivity level of said reflective element;
   a first user selection means for providing an input signal to said control circuit adapted to establishing a first reflectivity level of said reflective element that is user selectable within a predefined range of reflectivity values; and
   override means including one of a rearwardly facing photosensor and a user-operated switch and means responsive to said one of said photosensor detecting light exceeding a predetermined level and said user-operated switch being actuated for momentarily overriding said first user selection means in order to establish a second reflectivity level of said reflective element irrespective of said first reflectivity level selected with said first user selection means.

17. The rearview mirror system in claim 16 wherein said predefined range of reflective values extends from the maximum reflectivity limit of said reflective element to a partial reflectivity level that is greater than the minimum reflectivity limit of said reflective element.

18. The rearview mirror system in claim 17 wherein said partial reflectivity level is at the minimum reflectivity limit of said reflective element.

19. A rearview mirror system for a vehicle comprising:
   a variable reflective element having a reflectivity level that is continuously variable within predefined limits;
   a control circuit having an output port connected with said reflective element for providing a drive signal to establish the reflectivity level of said reflective element;
   a first user selection means for providing an input signal to said control circuit adapted to establishing a first reflectivity level of said reflective element that is user selectable within a predefined range of reflectivity values; and
   override means for overriding said first user selection means in order to establish a second reflectivity level of said reflective element irrespective of said first reflectivity level selected with said first user selection means, wherein said override means includes timer means for terminating said override means overriding said first user selection means after a predetermined time duration.

20. The rearview mirror system in claim 19 wherein said override means includes a second user selection means that is actuatable in order to start said timer means if said timer means is not timing and is actuatable in order to reset said timer means if said timer means is timing.

21. The rearview mirror system in claim 19 further including a user selectable mode control switch to establish the reflectivity level of the reflectance element at its maximum reflectivity limit.

22. The rearview mirror system in claim 19 further including another variable reflective element having a reflectivity level that is continuously variable within s id predefined limit and wherein said control circuit has another output port connected with said another reflective element for providing another drive signal to establish the reflectivity level of said another reflective element.

23. The rearview mirror system in claim 22 wherein said first user selection means establishes said first reflectivity level for both said reflective elements.

24. The rearview mirror system in claim 22 including a second user selection means for providing another input signal to said control circuit adapted to establishing a third reflectivity level of said another reflective element that is user selectable within another predefined range of reflectivity values.

25. The rearview mirror system in claim 24 wherein said override means also overrides said second user selection means in order to establish said second reflectivity level of said reflective element irrespective of said third reflectivity level selected with said second user selection means.

26. A rearview mirror system for a vehicle comprising:
   a variable reflective element having a reflectivity level that is continuously variable within predefined limits;
   user level setting means for manually setting the reflectivity level of said reflective element at a desired value;
   user actuatable means responsive to a first user actuation for setting the reflectivity level of said reflective element at an override value that is lower than said desired value; and
   return means for returning the reflectivity level of said reflective element to said desired value subsequent to said first user actuation.

27. The rearview mirror system in claim 26 wherein said override value is the minimum reflectivity limit of said variable reflective element.

28. The rearview mirror system in claim 26 wherein said return means includes said user actuatable means being responsive to a second user actuation in order to allow said user level setting means to establish the reflectivity level of said reflective element.

29. A rearview mirror system for a vehicle comprising:
   a variable reflective element having a reflectivity level that is continuously variable within predefined limits;
   user level setting means for manually setting the reflectivity level of said reflective element at a desired value;
   user actuatable means responsive to a first user actuation for setting the reflectivity level of said reflective element at an override value that is lower than said desired value, wherein said user actuatable means is responsive to a second user actuation in order to allow said user level setting means to establish the reflectivity level of said reflective element; and
   timing means for allowing said user level setting means to establish the reflectivity level of said reflective element a predetermined time duration after said first user actuation of said user actuatable means.

30. The rearview mirror system in claim 26 wherein said reflective element is a solid-state electrochromic device.

31. The rearview mirror system in claim 26 wherein said variable reflective element is an interior mirror having a case and wherein at least one of said user level setting means and said user actuatable means is housed in said case.

32. The rearview mirror system in claim 31 wherein said user level setting means includes switch means mounted on the outer surface of said case.

33. The rearview mirror system in claim 26 further including remote positioning means for positioning said variable reflective element and wherein said user actuatable means includes switch means mounted close to said remote positioning means.

34. The rearview mirror system in claim 33 wherein said remote positioning means is a laterally actuatable joystick and wherein said user actuatable means includes means responsive to axial movement of said joystick.

35. The rearview mirror system in claim 26 wherein said user level setting means includes switch means mounted adjacent one of the steering wheel and the steering column of the vehicle.

36. The rearview mirror system in claim 30 wherein said user actuatable means includes switch means mounted adjacent one of the steering wheel and the steering column of the vehicle.

37. The rearview mirror system in claim 26 wherein including memory means for storing at least one said desired value when electrical power is removed from said mirror system.

38. The rearview mirror system in claim 29 wherein including memory means for storing at least one said desired value when electrical power is removed from said mirror system.

* * * * *

UNITED STATES PATENT AND TRADEMARK OFFICE
CERTIFICATE OF CORRECTION

PATENT NO. : 5,122,647

DATED : June 16, 1992

INVENTOR(S) : Niall R. Lynam and Dale M. Roberts

It is certified that error appears in the above-identified patent and that said Letters Patent is hereby corrected as shown below:

```
Column 5, line 57:
     After "is" insert --a--.

Column 8, line 59, claim 9:
     "userinput" should be --user input--.

Column 9, line 16, claim 12:
     "grater" should be --greater--.

Column 10, lines 30 and 31, claim 22:
     "within s id" should be --within said--.

Column 12, line 24, claim 37:
     "wherein" should be --further--.

Column 12, line 28, claim 38:
     "wherein" should be --further--.
```

Signed and Sealed this

Fifth Day of October, 1993

Attest:

BRUCE LEHMAN

Attesting Officer

Commissioner of Patents and Trademarks